United States Patent
Li et al.

(10) Patent No.: US 9,845,377 B2
(45) Date of Patent: Dec. 19, 2017

(54) METHOD FOR PREPARING HIGH MOLECULAR WEIGHT POLY-L-LACTIC ACID

(71) Applicant: Nanjing University, Nanjing (CN)

(72) Inventors: Hong Li, Nanjing (CN); Quanxing Zhang, Nanjing (CN); Xupeng Zong, Nanjing (CN); Aimin Li, Nanjing (CN); Wei Huang, Nanjing (CN); Wei Jiang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 164 days.

(21) Appl. No.: 14/854,009

(22) Filed: Sep. 14, 2015

(65) Prior Publication Data

US 2016/0168316 A1    Jun. 16, 2016

Related U.S. Application Data

(63) Continuation-in-part of application No. PCT/CN2015/081253, filed on Jun. 11, 2015.

(30) Foreign Application Priority Data

Dec. 12, 2014  (CN) .......................... 2014 1 0765621

(51) Int. Cl.
  *C08G 63/08*  (2006.01)
  *C08G 63/78*  (2006.01)
  *C08G 63/82*  (2006.01)

(52) U.S. Cl.
  CPC ............. *C08G 63/08* (2013.01); *C08G 63/78* (2013.01); *C08G 63/823* (2013.01)

(58) Field of Classification Search
  CPC ............................. C08G 63/08; C08G 3/8236
  See application file for complete search history.

(56) References Cited

U.S. PATENT DOCUMENTS

2014/0142275 A1* 5/2014 Li .......................... A61L 27/18
                                                          528/361

FOREIGN PATENT DOCUMENTS

CN              1556128 A    * 12/2004

* cited by examiner

*Primary Examiner* — Rachel Kahn
(74) *Attorney, Agent, or Firm* — Matthias Scholl, PC; Matthias Scholl

(57) ABSTRACT

A method for preparing high molecular weight poly(L-lactic acid) with high performance, including: a) providing a biogenic guanidine (BG) as a catalyst, and a nontoxic acid salt of an essential metal trace element as an activator (Act), and adding the catalyst, the activator, and L-lactide monomer to a polymerization reactor; b) evacuating under vacuum and charging the polymerization reactor with nitrogen for three consecutive times to remove air, and allowing the L-lactide monomer to undergo bulk polymerization under vacuum. The bulk polymerization includes a first reaction stage and a second reaction stage, which are separately carried out at different temperatures, pressures, and reaction times.

6 Claims, No Drawings

METHOD FOR PREPARING HIGH MOLECULAR WEIGHT POLY-L-LACTIC ACID

CROSS-REFERENCE TO RELATED APPLICATIONS

This application is a continuation-in-part of International Patent Application No. PCT/CN2015/081253 with an international filing date of Jun. 11, 2015, designating the United States, now pending, and further claims priority benefits to Chinese Patent Application No. 201410765621.9 filed Dec. 12, 2014. The contents of all of the aforementioned applications, including any intervening amendments thereto, are incorporated herein by reference.

BACKGROUND OF THE INVENTION

Field of the Invention

The invention relates to a method for preparing high molecular weight poly(L-lactic acid) (PLLA) with high performance.

Description of the Related Art

Poly(lactic acid) is widely used in medicine. It features excellent biocompatibility. Conventional preparation methods of commercial-scale poly(lactic acid) employ stannous octoate as catalyst. However, the tin salt is cytotoxic and difficult to separate from the product.

SUMMARY OF THE INVENTION

In view of the above-described problems, it is one objective of the invention to provide a method for preparing high molecular weight poly(L-lactic acid). The resulting poly(L-lactic acid) features high biocompatibility and high performance.

To achieve the above objective, in accordance with one embodiment of the invention, there is provided a method for preparing high molecular weight poly(L-lactic acid) (PLLA) with high performance, the method comprising:

a) providing a biogenic guanidine (BG) as a catalyst, and a nontoxic acid salt of an essential metal trace element as an activator (Act), and adding the catalyst, the activator, and L-lactide monomer to a polymerization reactor; and b) evacuating under vacuum and charging the polymerization reactor with nitrogen for three consecutive times to remove air, and allowing the L-lactide monomer to undergo bulk polymerization under vacuum.

The bulk polymerization comprises a first reaction stage and a second reaction stage. In the first stage, a reaction temperature is between 125 and 140° C., a reaction pressure is between 0.4 and 0.6 torr, a reaction time is between 16 and 24 hours, and a resulting product is medium molecular weight poly-L-lactic acid (m-PLLA) having a weight average molecular weight (Mw) of between $4.0 \times 10^4$ and $5.0 \times 10^4$. In the second reaction stage, a reaction temperature is between 140 and 160° C., a reaction pressure is between 0.1 and 0.3 torr, a reaction time is between 25 and 60 hours, and a final product is a high molecular weight poly-L-lactic acid (h-PLLA) having a weight average molecular weight of between $4.0 \times 10^5$ and $5.5 \times 10^5$.

The bulk polymerization is represented by the following equations:

the first reaction stage of bulk polymerization:

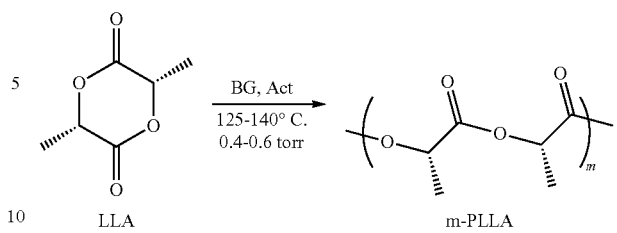

the second reaction stage of bulk polymerization:

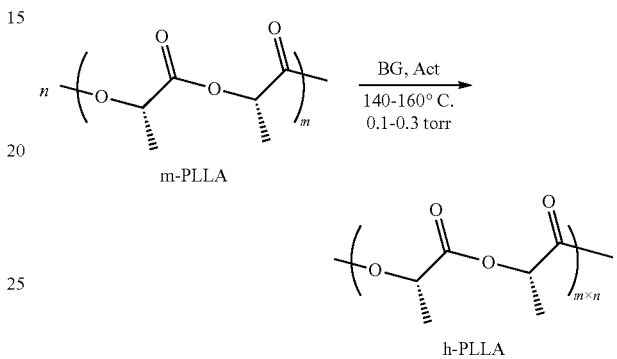

* LLA: L-lactide;
m-PLLA: medium molecular weight poly-L-lactic acid;
h-PLLA: high molecular weight poly-L-lactic acid;
BG: biogenic guanidine;
Act: activator.

In a class of this embodiment, the final product is nontoxic and has the following performance index: a polydispersity index (PDI) is less than or equal to 1.70, a melting point (Tm) is greater than or equal to 185° C., a crystallinity (Xc) is greater than or equal to 80.2%, with snowy white color.

In a class of this embodiment, the final product has the following performance index: Mw=$5.5 \times 10^5$, PDI=1.50, Tm=188° C., and Xc=82.9%.

In a class of this embodiment, the catalyst biogenic guanidine is an organic guanidine derivative resulting from arginine metabolism and energy storage/release, comprising arginine, glycocyamine, creatine, creatinine, phosphocreatine; the nontoxic acid salt is a salt of K, Fe, Zn, or Ca; the catalyst and the activator constitute a two-component catalyst system, and a dosage of the two-component catalyst system accounts for between 0.001 and 0.05 wt. % of that of the L-lactide monomer.

In a class of this embodiment, the nontoxic acid salt is a carbonate, acetate, lactate, or glycolate.

In a class of this embodiment, the nontoxic acid salt is $K_2CO_3$, $FeCO_3$, $(CH_3CH(OH)COO)_2Zn$, $CaCO_3$, $(CH_3CH(OH)COO)_2Ca$, $CH_3COOK$, $(HOCH_2COO)_2Zn$, or $(CH_3COO)_2Ca$.

An identification result from Chinese authoritative organization shows that the high performance high molecular weight poly(L-lactic acid) contains no cytotoxicity.

Advantages of the method for preparing poly(L-lactic acid) are summarized as follows.

1. The method employs a nontoxic two-component (a catalyst+an activator) catalyst system, which is environmentally friendly.

2. The method involves no solvent and employs bulk polymerization, no waste water, waste air and waste residue are produced, so it is environmentally friendly.

3. The final product contains no LLA monomer and no cytotoxicity, and thus it is a biodegradable polymer, with high biosafety.

4. The final product can be prepared according to practical requirements and has the following performance index: a weight average molecular weight (Mw) is $4.0$-$5.5 \times 10^5$, a polydispersity index (PDI) is less than or equal to 1.70, a melting point (Tm) is greater than or equal to 185° C., a crystallinity (Xc) is greater than or equal to 80.2%, with snowy white color. The product has wide applications in the medicine and pharmacy fields.

5. The final product has the following performance index: Mw=$5.5 \times 10^5$, PDI=1.50, Tm=188° C., and Xc=82.9%, with snowy white color.

DETAILED DESCRIPTION OF THE EMBODIMENTS

For further illustrating the invention, experiments detailing a method for preparing poly(L-lactic acid) are described below. It should be noted that the following examples are intended to describe and not to limit the invention.

LLA monomer, a catalyst and an activator are added to a polymerization reactor. The dosage of the two-component catalyst system accounts for between 0.001 and 0.05 wt. % of that of the LLA monomer. The polymerization reactor is vacuumized and charged with nitrogen for three consecutive times for air removal, and then is allowed for bulk polymerization, which comprises a first reaction stage and a second reaction stage. In the first reaction stage, a reaction temperature is between 125 and 140° C., a reaction pressure is between 0.4 and 0.6 torr, a reaction time is between 16 and 24 hours, and a resulting product is medium molecular weight poly-L-lactic acid (m-PLLA) having a weight average molecular weight (Mw) of between $4.0 \times 10^4$ and $5.0 \times 10^4$. Thereafter, the second reaction stage is followed, where a reaction temperature is between 140 and 160° C., a reaction pressure is between 0.1 and 0.3 torr, a reaction time is between 25 and 60 hours, and a final product is a high molecular weight poly-L-lactic acid (h-PLLA) having a weight average molecular weight of between $4.0 \times 10^5$ and $5.5 \times 10^5$.

Example 1

200.0 g of LLA, 2.0 mg of arginine, and 2.0 mg of $K_2CO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 125° C., a reaction pressure was 0.4 torr, a reaction time was 16 hours, and a resulting product was medium molecular weight poly-L-lactic acid (m-PLLA) having a weight average molecular weight (Mw) of $5.0 \times 10^4$. Thereafter, the second reaction stage was followed, where a reaction temperature was 140° C., a reaction pressure was 0.1 torr, a reaction time was 40 hours, and a final product was a high molecular weight poly-L-lactic acid (h-PLLA) having a weight average molecular weight of $5.5 \times 10^5$. The final product has the following performance index: Mw=$5.5 \times 10^5$, PDI=1.50, Tm=188.1° C., Xc=82.9%, and snowy white in color.

Example 2

200.0 g of LLA, 2.0 mg of arginine, and 2.0 mg of $K_2CO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 125° C., a reaction pressure was 0.4 torr, a reaction time was 16 hours, and a resulting product was medium molecular weight poly-L-lactic acid (m-PLLA) having a weight average molecular weight (Mw) of $5.0 \times 10^4$. Thereafter, the second reaction stage was followed, where a reaction temperature was 140° C., a reaction pressure was 0.1 torr, a reaction time was 39 hours, and a final product was a high molecular weight poly-L-lactic acid (h-PLLA) having a weight average molecular weight of $5.4 \times 10^5$. The final product has the following performance index: Mw=$5.4 \times 10^5$, PDI=1.51, Tm=187.9° C., Xc=82.5%, and snowy white in color.

Example 3

200.0 g of LLA, 2.0 mg of arginine, and 2.0 mg of $K_2CO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 125° C., a reaction pressure was 0.4 torr, a reaction time was 16 hours, and a resulting product was medium molecular weight poly-L-lactic acid (m-PLLA) having a weight average molecular weight (Mw) of $5.0 \times 10^4$. Thereafter, the second reaction stage was followed, where a reaction temperature was 140° C., a reaction pressure was 0.1 torr, a reaction time was 38 hours, and a final product was a high molecular weight poly-L-lactic acid (h-PLLA) having a weight average molecular weight of $5.3 \times 10^5$. The final product has the following performance index: Mw=$5.3 \times 10^5$, PDI=1.53, Tm=187.8° C., Xc=82.4%, and snowy white in color.

Example 4

200.0 g of LLA, 2.0 mg of arginine, and 2.0 mg of $K_2CO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 125° C., a reaction pressure was 0.4 torr, a reaction time was 16 hours, and a resulting product was medium molecular weight poly-L-lactic acid (m-PLLA) having a weight average molecular weight (Mw) of $5.0 \times 10^4$. Thereafter, the second reaction stage was followed, where a reaction temperature was 140° C., a reaction pressure was 0.1 torr, a reaction time was 37 hours, and a final product was a high molecular weight poly-L-lactic acid (h-PLLA) having a weight average molecular weight of $5.2 \times 10^5$. The final product has the following performance index: Mw=$5.2 \times 10^5$, PDI=1.53, Tm=187.8° C., Xc=82.3%, and snowy white in color.

Example 5

200.0 g of LLA, 2.0 mg of arginine, and 2.0 mg of $K_2CO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 125° C., a reaction pressure was 0.4 torr, a reaction time was 16 hours, and a resulting product was medium molecular weight poly-L-lactic acid (m-PLLA) having a weight average molecular weight (Mw) of $5.0 \times 10^4$. Thereafter, the second reaction stage was followed, where a reaction temperature was 140° C., a reaction pressure was 0.1 torr, a reaction time was 36 hours, and a final product was a high molecular weight poly-L-lactic acid (h-PLLA) having a weight average molecular weight of $5.1 \times 10^5$. The final product has the following performance index: $Mw=5.1 \times 10^5$, $PDI=1.52$, $Tm=187.6°$ C., $Xc=82.2\%$, and snowy white in color.

Example 6

100.0 g of LLA, 2.0 mg of arginine, and 2.0 mg of $K_2CO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 125° C., a reaction pressure was 0.4 torr, a reaction time was 16 hours, and a resulting product was medium molecular weight poly-L-lactic acid (m-PLLA) having a weight average molecular weight (Mw) of $5.0 \times 10^4$. Thereafter, the second reaction stage was followed, where a reaction temperature was 140° C., a reaction pressure was 0.1 torr, a reaction time was 40 hours, and a final product was a high molecular weight poly-L-lactic acid (h-PLLA) having a weight average molecular weight of $5.0 \times 10^5$. The final product has the following performance index: $Mw=5.0 \times 10^5$, $PDI=1.54$, $Tm=187.4°$ C., $Xc=82.1\%$, and snowy white in color.

Example 7

150.0 g of LLA, 4.5 mg of arginine, and 4.5 mg of $K_2CO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 125° C., a reaction pressure was 0.4 torr, a reaction time was 16 hours, and a resulting product was medium molecular weight poly-L-lactic acid (m-PLLA) having a weight average molecular weight (Mw) of $5.0 \times 10^4$. Thereafter, the second reaction stage was followed, where a reaction temperature was 140° C., a reaction pressure was 0.1 torr, a reaction time was 36 hours, and a final product was a high molecular weight poly-L-lactic acid (h-PLLA) having a weight average molecular weight of $4.5 \times 10^5$. The final product has the following performance index: $Mw=4.5 \times 10^5$, $PDI=1.58$, $Tm=186.8°$ C., $Xc=82.1\%$, and snowy white in color.

Example 8

200.0 g of LLA, 8.0 mg of arginine, and 8.0 mg of $K_2CO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 125° C., a reaction pressure was 0.4 torr, a reaction time was 16 hours, and a resulting product was medium molecular weight poly-L-lactic acid (m-PLLA) having a weight average molecular weight (Mw) of $5.0 \times 10^4$. Thereafter, the second reaction stage was followed, where a reaction temperature was 140° C., a reaction pressure was 0.1 torr, a reaction time was 25 hours, and a final product was a high molecular weight poly-L-lactic acid (h-PLLA) having a weight average molecular weight of $4.0 \times 10^5$. The final product has the following performance index: $Mw=4.0 \times 10^5$, $PDI=1.51$, $Tm=185.4°$ C., $Xc=80.5\%$, and snowy white in color.

Example 9

80.0 g of LLA, 5.6 mg of glycocyamine, and 3.2 mg of $FeCO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 132° C., a reaction pressure was 0.5 torr, a reaction time was 20 hours, and a resulting product was medium molecular weight poly-L-lactic acid (m-PLLA) having a weight average molecular weight (Mw) of $4.5 \times 10^4$. Thereafter, the second reaction stage was followed, where a reaction temperature was 150° C., a reaction pressure was 0.2 torr, a reaction time was 45 hours, and a final product was a high molecular weight poly-L-lactic acid (h-PLLA) having a weight average molecular weight of $5.5 \times 10^5$. The final product has the following performance index: $Mw=5.5 \times 10^5$, $PDI=1.56$, $Tm=188.0°$ C., $Xc=82.7\%$, and snowy white in color.

Example 10

80.0 g of LLA, 5.6 mg of glycocyamine, and 3.2 mg of $FeCO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 132° C., a reaction pressure was 0.5 torr, a reaction time was 20 hours, and a resulting product was medium molecular weight poly-L-lactic acid (m-PLLA) having a weight average molecular weight (Mw) of $4.5 \times 10^4$. Thereafter, the second reaction stage was followed, where a reaction temperature was 150° C., a reaction pressure was 0.2 torr, a reaction time was 38 hours, and a final product was a high molecular weight poly-L-lactic acid (h-PLLA) having a weight average molecular weight of $4.9 \times 10^5$. The final product has the following performance index: $Mw=4.9 \times 10^5$, $PDI=1.61$, $Tm=187.4°$ C., $Xc=81.9\%$, and snowy white in color.

Example 11

80.0 g of LLA, 5.6 mg of glycocyamine, and 3.2 mg of $FeCO_3$ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 132° C., a reaction pressure was 0.5 torr, a reaction time was 16 hours, and a resulting product was medium molecular weight poly-L-lactic acid (m-PLLA) having a weight average molecular weight (Mw) of $4.5 \times 10^4$. Thereafter, the second reaction stage was followed, where a reaction temperature was 150° C., a reaction pressure was 0.2 torr, a reaction time was 32 hours, and a final product was a high molecular weight poly-L-lactic acid (h-PLLA) having a weight average molecular weight of 4.4×10⁵. The final product has the following performance index: Mw=4.4×10⁵, PDI=1.58, Tm=186.4° C., Xc=80.6%, and snowy white in color.

Example 12

80.0 g of LLA, 5.6 mg of glycocyamine, and 3.2 mg of FeCO₃ were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 132° C., a reaction pressure was 0.5 torr, a reaction time was 20 hours, and a resulting product was medium molecular weight poly-L-lactic acid (m-PLLA) having a weight average molecular weight (Mw) of 4.5×10⁴. Thereafter, the second reaction stage was followed, where a reaction temperature was 150° C., a reaction pressure was 0.2 torr, a reaction time was 26 hours, and a final product was a high molecular weight poly-L-lactic acid (h-PLLA) having a weight average molecular weight of 4.0×10⁵. The final product has the following performance index: Mw=4.0×10⁵, PDI=1.61, Tm=185.2° C., Xc=80.4%, and snowy white in color.

Example 13

50.0 g of LLA, 25.0 mg of phosphocreatine, and 25.0 mg of (CH₃CH(OH)COO)₂Ca were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 140° C., a reaction pressure was 0.6 torr, a reaction time was 24 hours, and a resulting product was medium molecular weight poly-L-lactic acid (m-PLLA) having a weight average molecular weight (Mw) of 4.0×10⁴. Thereafter, the second reaction stage was followed, where a reaction temperature was 160° C., a reaction pressure was 0.3 torr, a reaction time was 60 hours, and a final product was a high molecular weight poly-L-lactic acid (h-PLLA) having a weight average molecular weight of 5.5×10⁵. The final product has the following performance index: Mw=5.5×10⁵, PDI=1.60, Tm=187.9° C., Xc=82.6%, and snowy white in color.

Example 14

50.0 g of LLA, 25.0 mg of phosphocreatine, and 25.0 mg of (CH₃CH(OH)COO)₂Ca were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 140° C., a reaction pressure was 0.6 torr, a reaction time was 24 hours, and a resulting product was medium molecular weight poly-L-lactic acid (m-PLLA) having a weight average molecular weight (Mw) of 4.0×10⁴. Thereafter, the second reaction stage was followed, where a reaction temperature was 160° C., a reaction pressure was 0.3 torr, a reaction time was 55 hours, and a final product was a high molecular weight poly-L-lactic acid (h-PLLA) having a weight average molecular weight of 4.8×10⁵. The final product has the following performance index: Mw=4.8×10⁵, PDI=1.58, Tm=187.3° C., Xc=81.8%, and snowy white in color.

Example 15

50.0 g of LLA, 25.0 mg of phosphocreatine, and 25.0 mg of (CH₃CH(OH)COO)₂Ca were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 140° C., a reaction pressure was 0.6 torr, a reaction time was 24 hours, and a resulting product was medium molecular weight poly-L-lactic acid (m-PLLA) having a weight average molecular weight (Mw) of 4.0×10⁴. Thereafter, the second reaction stage was followed, where a reaction temperature was 160° C., a reaction pressure was 0.3 torr, a reaction time was 50 hours, and a final product was a high molecular weight poly-L-lactic acid (h-PLLA) having a weight average molecular weight of 4.6×10⁵. The final product has the following performance index: Mw=4.6×10⁵, PDI=1.62, Tm=186.8° C., Xc=81.5%, and snowy white in color.

Example 16

50.0 g of LLA, 25.0 mg of phosphocreatine, and 25.0 mg of (CH₃CH(OH)COO)₂Ca were added to a polymerization reactor. The polymerization reactor was vacuumized and charged with nitrogen for three consecutive times for air removal, and then was allowed for bulk polymerization, which comprised a first reaction stage and a second reaction stage. In the first reaction stage, a reaction temperature was 140° C., a reaction pressure was 0.6 torr, a reaction time was 24 hours, and a resulting product was medium molecular weight poly-L-lactic acid (m-PLLA) having a weight average molecular weight (Mw) of 4.0×10⁴. Thereafter, the second reaction stage was followed, where a reaction temperature was 160° C., a reaction pressure was 0.3 torr, a reaction time was 45 hours, and a final product was a high molecular weight poly-L-lactic acid (h-PLLA) having a weight average molecular weight of 4.0×10⁵. The final product has the following performance index: Mw=4.0×10⁵, PDI=1.59, Tm=185.1° C., Xc=80.2%, and snowy white in color.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A method for preparing poly(L-lactic acid), comprising:
 a) providing a biogenic guanidine (BG) as a catalyst and an acid salt of a trace metal as an activator (Act), and adding the catalyst, the activator, and L-lactide monomer (LLA) to a polymerization reactor;
 b) evacuating and purging the polymerization reactor with nitrogen three times to remove air, evacuating the polymerization reactor and conducting bulk polymerization of the L-lactide monomer under vacuum;

wherein:
- the trace metal is selected from a group consisting of potassium (K), iron (Fe), zinc (Zn), and calcium (Ca);
- the bulk polymerization comprises a first reaction stage and a second reaction stage;
- in the first reaction stage, a reaction temperature is between 125 and 140° C., a reaction pressure is between 0.4 and 0.6 torr, a reaction time is between 16 and 24 hours, and a resulting product is a medium molecular weight poly-L-lactic acid (m-PLLA) having a weight average molecular weight (Mw) of between $4.0 \times 10^4$ and $5.0 \times 10^4$;
- in the second reaction stage, a reaction temperature is between 140 and 160° C., a reaction pressure is between 0.1 and 0.3 torr, a reaction time is between 25 and 60 hours, and a final product is a high molecular weight poly-L-lactic acid (h-PLLA) having a weight average molecular weight of between $4.0 \times 10^5$ and $5.5 \times 10^5$;
- the first reaction stage of the bulk polymerization is represented by equation I:

Equation I

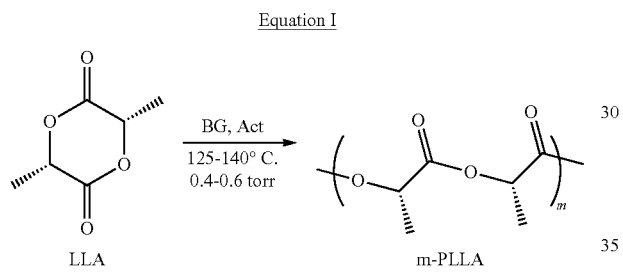

the second reaction stage of bulk polymerization is represented by equation II:

Equation II

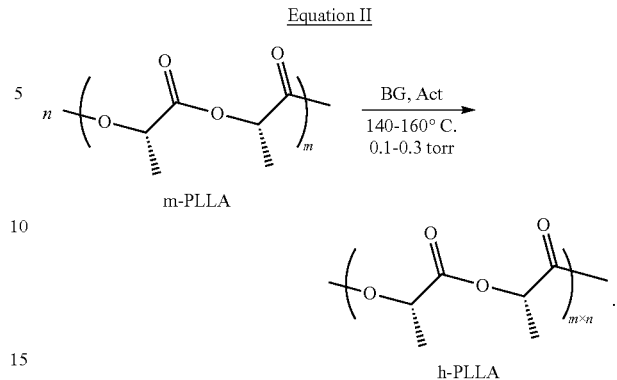

2. The method of claim 1, wherein the final product has a white color and has the following performance index: a polydispersity index (PDI) is less than or equal to 1.70, a melting point (Tm) is greater than or equal to 185° C., and a crystallinity (Xc) is greater than or equal to 80.2%.

3. The method of claim 2, wherein the final product has the following performance index: Mw=$5.5 \times 10^5$, PDI=1.50, Tm=188° C., and Xc=82.9%.

4. The method of claim 1, wherein
    the catalyst is an organic guanidine derivative selected from a group consisting of arginine, glycocyamine, creatine, creatinine, and phosphocreatine; and
    the catalyst and the activator constitute a two-component catalyst system, and a dosage of the two-component catalyst system accounts for between 0.001 and 0.05 wt. % of that of the L-lactide monomer.

5. The method of claim 4, wherein the acid salt is a carbonate, acetate, lactate, or glycolate.

6. The method of claim 5, wherein the acid salt is $K_2CO_3$, $FeCO_3$, $(CH_3CH(OH)COO)_2Zn$, $CaCO_3$, $(CH_3CH(OH)COO)_2Ca$, $CH_3COOK$, $(HOCH_2COO)_2Zn$, or $(CH_3COO)_2Ca$.

* * * * *